United States Patent
Muet et al.

(10) Patent No.: US 9,899,130 B2
(45) Date of Patent: Feb. 20, 2018

(54) ANCHORING CLAMP FOR AN INSULATED ELECTRICAL CABLE

(71) Applicant: SOCIETE INDUSTRIELLE DE CONSTRUCTION D'APPAREILS ET DE MATERIEL ELECTRIQUES, Arnac Pompadour (FR)

(72) Inventors: Pierre-Jean Bernard Muet, Panazol (FR); Serge Charieyras, Arnac Pompadour (FR); Guillaume Cyril Florent Morin, Vicq sur Breuilh (FR)

(73) Assignee: SOCIETE INDUSTRIELLE DE CONSTRUCTION D'APPAREILS ET DE MATERIEL ELECTRIQUES, Arnac Pompadour (FR)

( * ) Notice: Subject to any disclaimer, the term of this patent is extended or adjusted under 35 U.S.C. 154(b) by 0 days.

(21) Appl. No.: 14/988,194

(22) Filed: Jan. 5, 2016

(65) Prior Publication Data

US 2016/0196901 A1 Jul. 7, 2016

(30) Foreign Application Priority Data

Jan. 5, 2015 (FR) ..................................... 15 50035

(51) Int. Cl.
*H01B 17/02* (2006.01)
*H01B 9/00* (2006.01)
*H02G 7/05* (2006.01)

(52) U.S. Cl.
CPC ............. *H01B 17/02* (2013.01); *H01B 9/008* (2013.01); *H02G 7/053* (2013.01)

(58) Field of Classification Search
CPC ........ H01B 17/02; H01B 17/22; H01B 9/008; H02G 7/053; H02G 7/056; H02G 7/12

(Continued)

(56) References Cited

U.S. PATENT DOCUMENTS 3,090,827 A * 5/1963 Mahaney ............... H02G 7/053
174/172
3,155,354 A * 11/1964 Lindsey ................... H02G 7/05
174/144

(Continued)

FOREIGN PATENT DOCUMENTS

DE 601 119 C 8/1934
DE 939 702 C 3/1956

(Continued)

OTHER PUBLICATIONS

French Search Report, dated Sep. 15, 2015, from corresponding French Application.

*Primary Examiner* — Anita M King
(74) *Attorney, Agent, or Firm* — Young & Thompson (57) ABSTRACT

An anchoring clamp for an insulated electrical cable, includes a body defining a housing for receiving the cable, a securing loop fastened to the body and configured to be attached to a support, and a cam rotatable relative to the body between a first position in which the cam is at a distance from the housing, and a second position in which the cam is in immediate proximity to the housing and is configured to clamp the cable in the housing, the anchoring clamp being configured to prevent the cam from passing freely from its second position to its first position and including a holding member which is distinct from the body, from the cam and from the securing loop, which is connected both to the body and to the cam and which is configured to prevent the cam from passing freely from its second position to its first position.

19 Claims, 7 Drawing Sheets

(58) Field of Classification Search
USPC .............. 248/63; 174/144, 172, 84 C, 40 CC
See application file for complete search history.

(56) References Cited

U.S. PATENT DOCUMENTS

| | | | | |
|---|---|---|---|---|
| 4,263,478 | A | * | 4/1981 | Willem .................. H01B 17/22 174/169 |
| 4,402,540 | A | * | 9/1983 | Willem .................. H01B 17/22 294/174 |
| 6,047,930 | A | * | 4/2000 | Bello ....................... H02G 7/12 24/132 R |
| 7,323,636 | B1 | * | 1/2008 | Borges ..................... H02G 7/12 174/40 CC |
| 2007/0017689 | A1 | * | 1/2007 | Polidori ................. H02G 7/056 174/84 C |

FOREIGN PATENT DOCUMENTS

| | | |
|---|---|---|
| FR | 2 783 645 A1 | 3/2000 |
| FR | 2 783 646 A1 | 3/2000 |
| FR | 2 998 723 A1 | 5/2014 |

\* cited by examiner

ANCHORING CLAMP FOR AN INSULATED ELECTRICAL CABLE

FIELD OF THE INVENTION

The invention concerns the general field of the transport and distribution of electrical energy, in particular on medium-voltage overhead networks, via insulated electrical cables (that is to say which are protected by a sheath of insulating material).

More particularly, the invention relates to anchoring clamps with automatic wedging for insulated electrical cables.

BACKGROUND OF THE INVENTION

Such anchoring clamps performing automatic wedging of an insulated electrical cable by its own action are already known.

For example, French patent application 2 998 723 describes a anchoring clamp comprising an elongate clamp body of metal which forms a slide longitudinally, a clamping member slidingly engaged in the slide and which comprises a housing configured to receive the insulated electrical cable, and a metal securing loop which is fastened to the clamp body and configured to be attached to a support of some kind.

The clamping member comprises two clamping wedges which are slidingly movable in the slide and which are each provided with a first end near the securing loop and a second end which is an opposite end to the first end, at a distance from the securing loop.

The clamping member is configured to radially deform and is provided with a contact lining with a high coefficient of adhesion and the slide has a continuously variable width over at least part of its length.

From French patent 2 783 646, another type of anchoring clamp is known that is usable for any suspended overhead line which does not require the clamp to provide electrical insulation under high voltage, and more particularly which is usable in the securing of optic fiber cables.

The anchoring clamp described in French patent 2 783 646 comprises a plate of synthetic material, a cam also of synthetic material and which is rotatable relative to the plate, and a hooking member constituted by a V-shaped metal wire the ends of which are fastened to the plate, so as to attach the clamp to a support of some kind.

The plate is formed from a flat flank and a channel-shaped curved part extending the flank and configured to receive an optic fiber cable. The plate has a hole formed in the flat flank a as well as a pawl also formed in the flat flank, at a distance from the hole. The pawl is provided with a lug formed projecting from the flank, on the same side as the curved part, and a gripping tab also formed projecting from the flank, on the opposite side to that of the curved part.

The cam has a lateral flange, a nipple projecting from the lateral flange and configured to engage in the hole formed in the flank of the plate and thereby enable the rotation of the cam relative to the plate, a rim with a convex surface, formed at a distance from the nipple and configured to come to bear against the optic fiber cable, and teeth formed projecting from the lateral flange and configured to be engaged with the lug of the pawl to immobilize the cam in one direction of rotation when the cable, located in the channel-shaped curved part, is clamped between the rim of the cam and the plate. To release the optic fiber cable, the lug and the teeth are disengaged by pulling on the tab of the pawl.

SUMMARY OF THE INVENTION

The invention is directed to providing an anchoring clamp of the same kind as those described above, but with improved mechanical performance, while being particularly simple, convenient and economical.

According to a first aspect, the invention thus relates to a anchoring clamp for an insulated electrical cable provided with a conducting core and an insulating sheath covering said conducting core, comprising a body defining a housing configured to receive said cable, a securing loop fastened to said body and configured to be attached to a support of some kind, and a cam rotatable relative to said body between a first position in which said cam is at a distance from said housing and a second position in which said cam is in immediate proximity to said housing and is configured to clamp said cable in said housing, said anchoring clamp being further configured to prevent said cam from passing freely from its second position to its first position; said anchoring clamp being characterized in that it comprises a holding member which is distinct from said body, from said cam and from said securing loop, which is connected both to said body and to said cam and which is configured to prevent said cam from passing freely from its second position to its first position.

By virtue of the fact that it comprises a holding member distinct from the body, from the cam and from the securing loop, the anchoring clamp according to the invention makes it possible to provide a cam as well as a clamp body that are particularly simple in comparison with the cam and the plate of the clamp described in the aforementioned prior art, which respectively comprise teeth and a pawl.

Furthermore, the clamp according to the invention makes it possible to produce the cam and the body from particular materials that are dedicated to their respective function, for example respectively of plastics material and of metal, the clamp thus being particularly robust.

It should be noted that the clamp according to the invention stays closed so long as the user does not act on the cam with a force at least greater than a predetermined threshold.

It should be noted that the anchoring clamp according to the invention is configured to clamp the insulated electrical cable in its clamp body, in particular when the cable is attached to a support of some kind, such as a utility pole.

The anchoring clamp according to the invention is thus particularly simple, convenient and economical, both with regard to manufacture and the assembly for the attachment of a cable.

According to preferred simple, convenient and economical features of the anchoring clamp according to the invention:

said holding member is further configured to prevent said cam from passing freely from its first position to its second position; the clamp thereby remaining open so long as a user does not act on the cam, so as to facilitate the insertion and/or the extraction of the cable to/from the housing;

said holding member has a first free end and a second free end which is an opposite free end to said first free end, and said body comprises at least two apertures axially offset from each other, formed at a distance from said housing and each configured to respectively receive said first and second free ends; which enables the holding member, when the user has acted on the cam to make it pass into its second position, to automatically apply a constant pressure on the cable housed in the housing of the body;

said holding member comprises a first curved limb, a second curved limb and a junction portion joining said first and second limbs, said first limb is provided with a first folded portion forming said first free end and said second limb is provided with a second folded portion forming said second free end;

said first folded portion is directed towards said second limb and said second folded portion is directed towards said first limb;

said body comprises a base in which is formed said housing, a lateral wall extending from said base and a curb projecting from said lateral wall, at a distance from said housing and in which are formed said at least two apertures;

said curb has a first face in which is formed one of the at least two said apertures and a second face, which is an opposite face to said first face, in which is formed the other of the at least two said apertures;

said lateral wall has a planar portion extending from said base and a rim extending from said planar portion at a distance from and facing said housing, and said curb projects from said rim, remotely from said housing;

said rim is L-shaped and is provided with a first limb extending from said planar portion and a second limb continuing said first limb and extending on the same side as said housing;

said body has an inside face at least partially defining said housing, an outside face which is an opposite face to said inside face, and at least one rib formed projecting from said inside face;

said securing loop comprises two arms connected to each other by an elbow portion, and said body has an inside face at least partially defining said housing, an outside face which is an opposite face to said inside face, and a block for fastening said securing loop and which is formed projecting from said outside face, which fastening block is provided with at least two guide grooves configured to receive at least partially the two said arms of said securing loop;

said body comprises a base in which is formed said housing and a lateral wall extending from said base, and said cam has a fastening portion rotatably mounted on said lateral wall and at a distance from said housing, and a clamping portion remote from said fastening portion and configured to be at a distance from said housing when the cam is in its first position and to be in immediate proximity to said housing when the cam is in its second position;

said clamp further comprises a journal configured to be inserted at least partially both in at least a first aperture formed in said lateral wall of said body, at a distance from said housing, and in a second aperture formed in said fastening portion of said cam; and said cam is rotatable around said journal relative to said body;

said clamping portion has a convex longitudinal profile directed away from said fastening portion and a concave transverse profile directed away from said fastening portion;

said concave transverse profile of said clamping portion forms a recess provided on a surface of said clamping portion, which recess is configured such that said cam, in its second position, conforms at least substantially and partially to a contour of said insulated electrical cable to keep it in said housing;

said clamping portion is provided with a plurality of transverse holding ribs and engaging spikes formed projecting from said surface, in said recess, and which are provided to come into contact with said insulating sheath of the insulated electrical cable; and/or said cam comprises an ear extending from said clamping portion and having a pressing and gripping portion configured to allow the passage from one to the other of the first and second positions of said cam under the action of a user; and/or said ear has a tab passing along an edge of said clamping portion so as to define a receiving space configured to receive a junction portion of said holding member.

According to a second aspect, the invention also relates to a method of assembling an anchoring clamp as described below, comprising the steps of:

providing a anchoring clamp comprising a body defining a housing configured to receive an insulated electrical cable, a securing loop fastened to said body and configured to be attached to a support of some kind, a cam which is rotatable relative to said body between a first position in which said cam is at a distance from said housing and a second position in which said cam is in immediate proximity to said housing and is configured to clamp said cable in said housing, and a holding member which is distinct from said body, from said cam and from said securing loop, which is connected both to said body and to said cam and which is configured to prevent said cam from passing freely from its second position to its first position and optionally, to prevent said cam from passing freely from its first position to its second position;

providing an insulated electrical cable having a conducting core and a sheath of insulating material covering said conducting core;

inserting said insulated electrical cable into said housing of said body of said anchoring clamp;

acting on said cam to pass it from its first position to its second position so as to clamp said insulated electrical cable in said housing.

The method of securing the insulated electrical cable using the anchoring clamp according to the invention is particularly simple and convenient to implement.

BRIEF DESCRIPTION OF THE DRAWINGS

The disclosure of the invention will now be continued with the description of an example embodiment, given below by way of illustrative and non-limiting example, with reference to the accompanying drawings, in which.

DETAILED DESCRIPTION OF THE INVENTION

Figure 1:
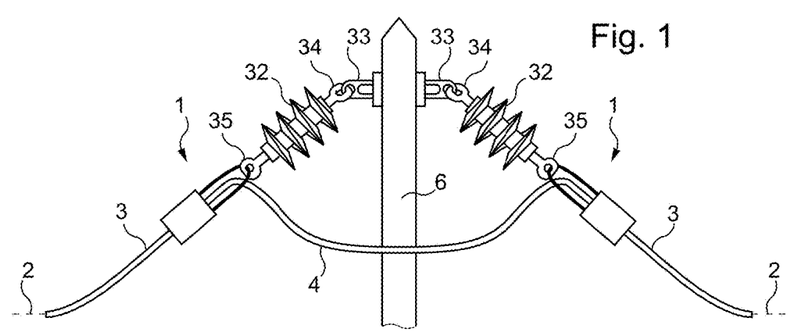
FIG. 1 is a diagram of the securing of an insulated electrical cable on an overhead network for transport and distribution of medium-voltage electrical energy via two anchoring clamps in accordance with the invention.

FIG. 1 shows the securing, or the attachment, by virtue of two anchoring clamps 1, of a medium-voltage overhead insulated electrical cable 2 to an attaching part of an electric pole 6 fastened to the ground (not shown).

This attaching part is formed here from two columns 33 fastened on each side of the pole 6 and from two insulators 32 each provided with a first end 34 and with a second end 35, which second end 35 is an opposite end to the first end 34.

Each insulator 32 is fastened by its first end 34 to a respective column 33.

The insulated electrical cable 2 is hooked to the electric pole 6 by two anchoring clamps 1 which are each secured, or attached, to the second end 35 of a respective insulator 32.

The insulated electrical cable 2, which is continuous, has two tensioned portions 3 as well as a non-tensioned portion 4 provided between the two tensioned portions 3 and interposed between the two anchoring clamps 1.

Figure 14:
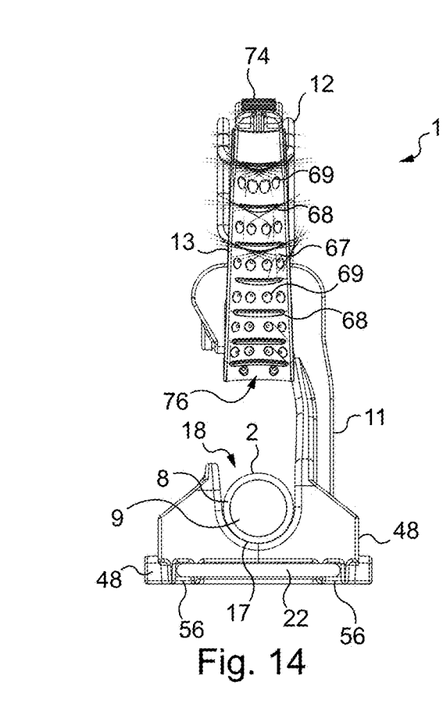
Figure 16:
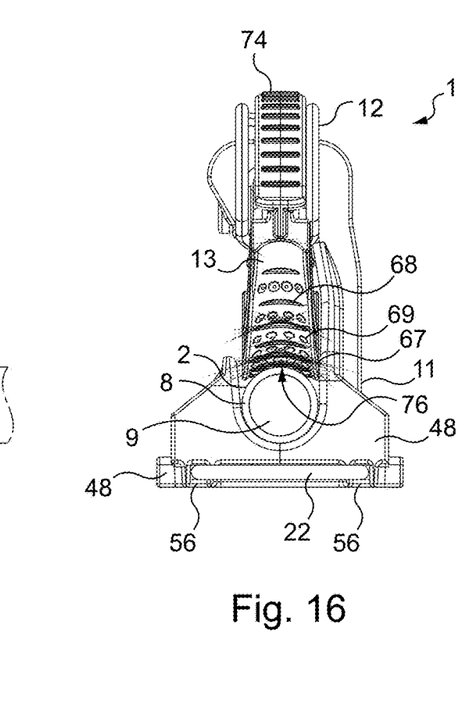

It should be noted that the insulated electrical cable 2 here comprises a central conducting core 9, for example of copper or of aluminum, as well as a sheath of insulating material 8 covering that conducting core 9. To simplify the terminology, in the rest of the description the sheath of insulating material will be called "insulating sheath 8" (FIGS. 14 and 16).

Figure 2:
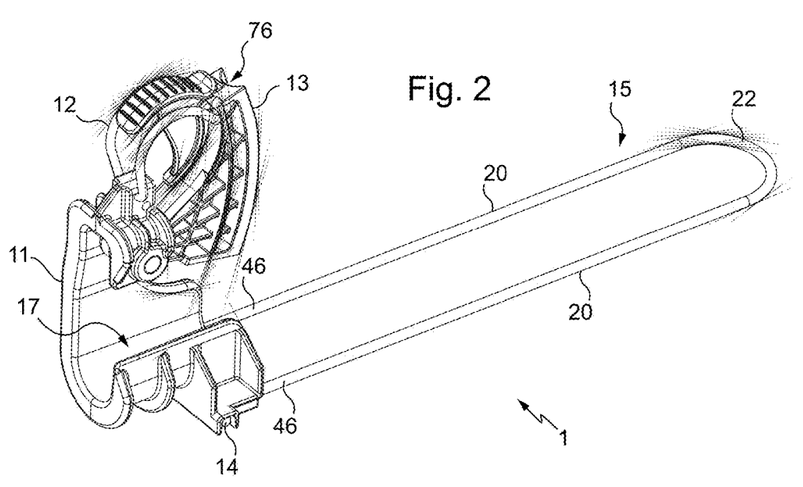
FIG. 2 is a perspective view of one of the anchoring clamps of FIG. 1, without the cable and in an open configuration.
Figure 3:
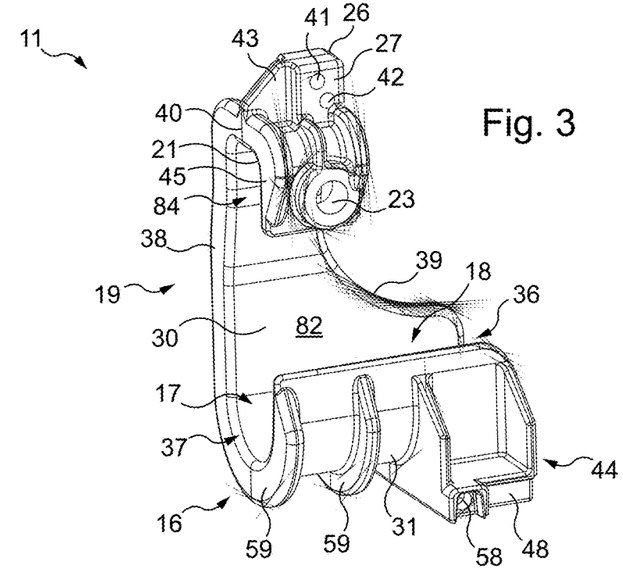
FIG. 3 is a perspective view of a body of the clamp illustrated in FIG. 2.
Figure 4:
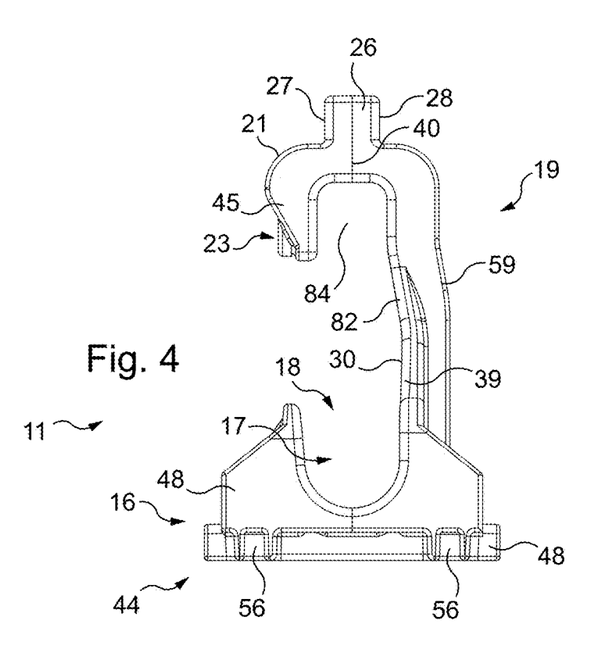
FIGS. 4 to 6 are views respectively from the front, side and below of the body illustrated in FIG. 3.
Figure 5:
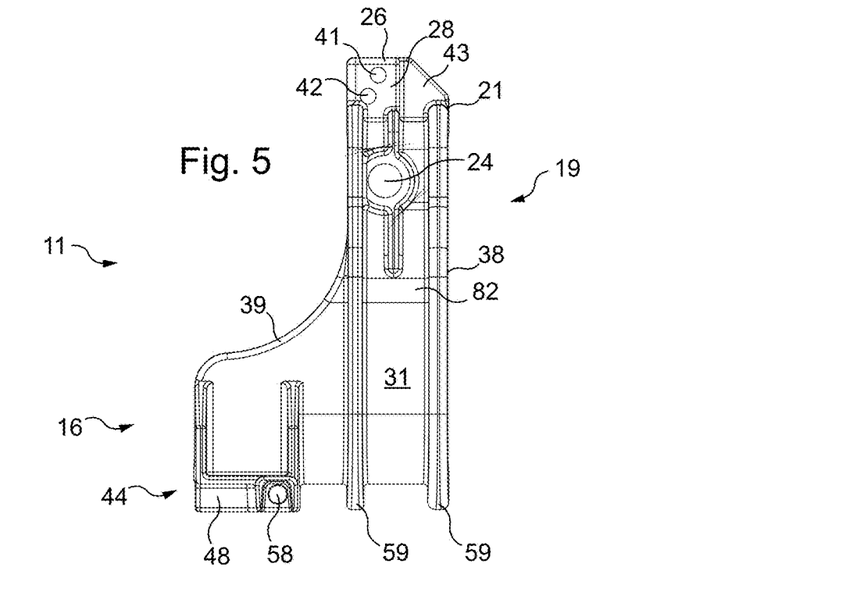
Figure 6:
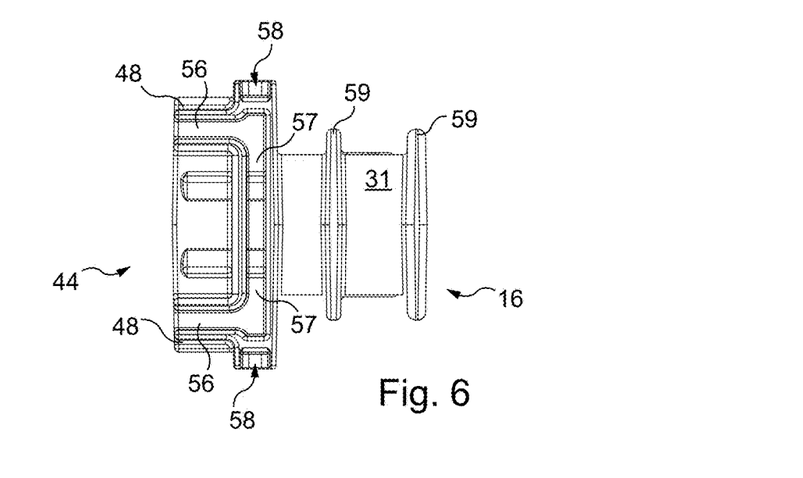
Figure 7:
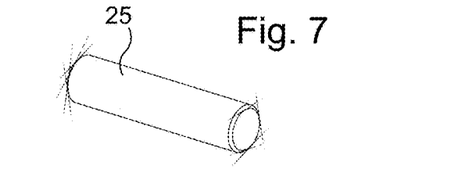
FIG. 7 is a perspective view of a journal of the clamp illustrated in FIG. 2.

As can be seen in FIG. 2, the anchoring clamp 1 comprises a clamp body 11, here metallic, defining a housing 17 configured to receive the insulated electrical cable 2 (not visible in FIG. 2), a securing loop 15, here metallic, fastened to that body 11, and a cam 13, here of plastics material, mounted on the body 11 and rotatable relative to the latter.

The anchoring clamp 1 further comprises a holding member, here formed by a spring 12, connected both to the cam 13 and to the body 11 and configured to hold the cam 13, without the latter being acted upon externally, in a position away from the housing 17 or in a position close to the housing 17.

In other words, the spring 12 is here configured to prevent the cam 13 from passing freely from one to the other of its away position, also called first stable position, to its close position, also called second stable position; when the cam 13 is not acted upon externally. It will be noted that in FIG. 2, the cam 13 is in its position away from the housing 17.

The spring 12 is furthermore configured to return the cam 13 to its stable starting position, away and close, so long as the cam 13 is not displaced beyond a tipping position.

Beyond that tipping position, the spring 12 is configured to drive the cam 13 towards its stable arrival position, respectively close or away.

The securing loop 15 here comprises two arms 20 connected to each other by an elbow portion 22. It is thus U-shaped.

As regards the elbow portion 22, this is configured to be secured, or attached, to the second end 35 of an insulator 32 (not visible in FIG. 2).

Each arm 20 has a free end 46 provided with a folded portion 14 directed towards the outside of the U.

Each folded portion 14 is configured here to be mechanically connected to the body 11.

The clamp body 11 will now be described in more detail with reference to FIGS. 3 to 6.

This body 11 here has an inside face 30 which delimits the housing 17 and an outside face 31 which is an opposite face to the inside face 30.

The housing 17 here has a half cylindrical shape elongated in a longitudinal direction of the clamp 1, and extends between a first end 36 situated on the same side as the elbow portion 22 of the securing loop 15, and a second end 37 which is an opposite end to the first end 36.

The body 11 comprises a base 16 in which the housing 17 is formed, a lateral wall 19 extending from the base 16 and a curb 26 projecting from the lateral wall 19 at a distance from the housing 17.

The body 11 further comprises a longitudinal opening 18 into the housing 17, which opening 18 is provided for the insertion and the extraction of the cable 2.

The base 16 has the shape of a gutter and extends longitudinally between the first and second ends 36 and 37 of the housing 17.

The lateral wall 19 extends from the base 16 on the same side as the opening 18.

The lateral wall 19 is provided with a rim 21 having an L-shaped cross-section and extending at a distance from and facing the housing 17, and a planar portion 82 extending between the base 16 and the rim 21.

The L-shaped rim 21 is provided with a first limb 40 and with a second limb 45 disposed substantially at a right angle relative to the first limb 40.

The first limb 40 extends from the planar portion 82 facing the housing 17, and the second limb 45 extends the first limb 40 and extends towards the base 16 so as to form a space 84 between the second limb 45 and the planar portion 82 of the lateral wall 19.

The planar portion 82 has a straight edge 38 adjacent the second end 37, and a curved edge 39, which is an opposite edge to the straight edge 38, on the same side as the first end 36.

The body 11 further comprises a first aperture 23 formed in the second limb 45 and opening into the space 84, as well as a second aperture 24 formed in the planar portion 82, facing the first aperture 23, and also opening into the space 84.

The first and second apertures 23 and 24 are configured to receive a journal 25 of the clamp 1, which journal 25 is configured to mount the cam 13 inside the space 84, rotatably relative to the body 11.

The curb 26 projects from the planar portion 82 on the opposite side to the housing 17 and has a first face 27 and a second face 28 which is an opposite face to the first face 27.

The curb 26 comprises a first through-aperture 41 opening on each side of the curb 26 on each of the first and second faces 27 and 28, as well as a second through-aperture 42 opening on each side of the curb 26 on each of the first and second faces 27 and 28.

The first aperture 41 and the second aperture 42 are axially offset relative to each other.

The body 11 further comprises a reinforcing bridging member 43 projecting from the lateral wall 19 and meeting the curb 26.

The body 11 further comprises a fastening block 44 for the securing loop 15 provided projecting from the outside face 31, and formed from two protuberances 48 disposed on respective opposite sides of the base 16. These two protuberances 48 are substantially situated on the same side as the first end 36 of the housing 17.

Each protuberance 48 has a longitudinal guide groove 56 and a through hole 58 opening in the respective groove 56.

Each protuberance 48 furthermore has a recess 57 provided opposite the respective through hole 58 and communicating with the respective groove 56.

Each guide groove 56 is configured to receive a portion of a free end 46 of a respective arm 20 of the securing loop 15, whereas each through hole 58 opening into the respective groove 56 is configured to receive the folded portion 14 of the respective free end 46.

The recesses 57 are configured to enable the folded portions 14 to be inserted into and extracted from the through-holes 58 by flexing of the arms 20 of the loop 15.

The body 11 is furthermore provided with two ribs 59 projecting from the outside face 31 and extending along the base 16 and along the lateral wall 19.

Figure 8:
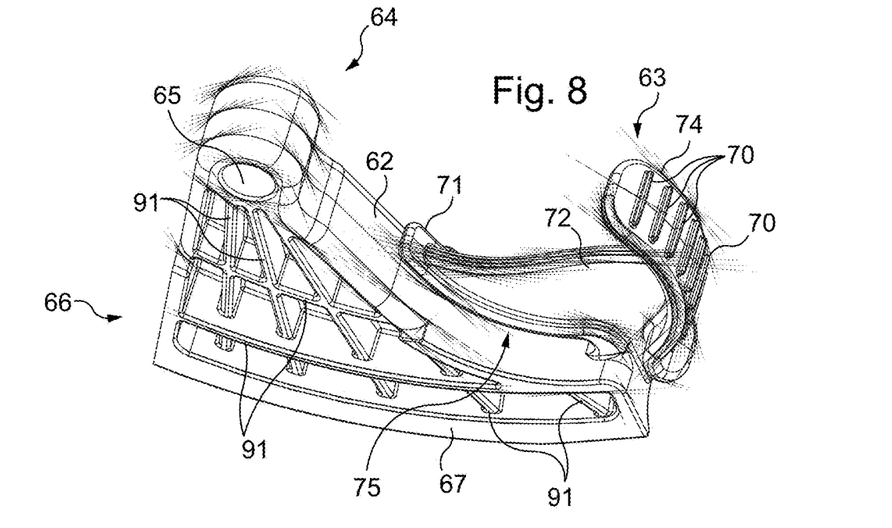
FIGS. 8 and 9 are views respectively in perspective and from the side of a cam of the clamp illustrated in FIG. 2.
Figure 9:
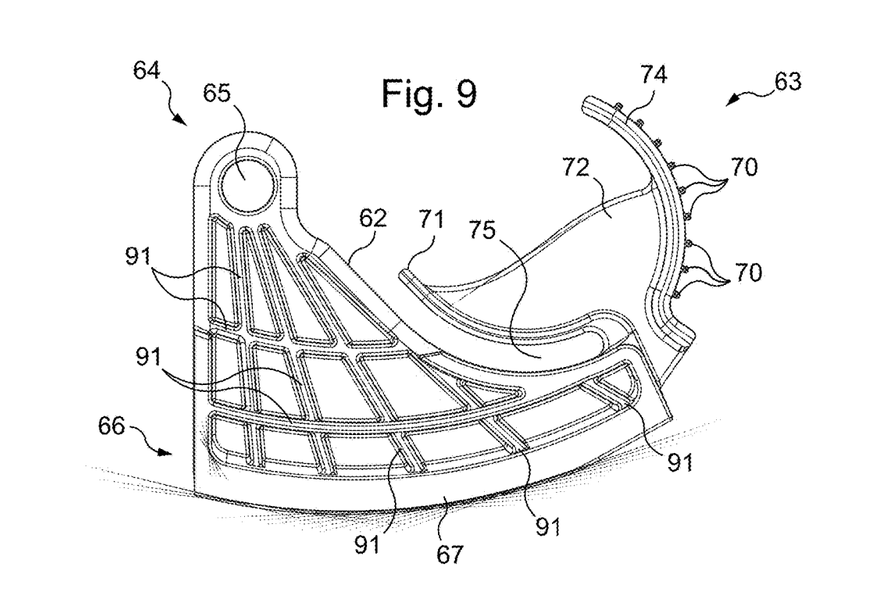

The cam 13 will now be described in more detail with reference to FIGS. 8 and 9.

The cam 13 comprises a fastening portion 64 configured to be rotatably mounted on the lateral wall 19 at a distance from the housing 17, and a clamping portion 66 remote from the fastening portion 64 and configured to be at a distance from the housing 17 when the cam 13 is in its first stable position and to be in immediate proximity to the housing 17 when the cam 13 is in its second stable position (see in more detail below).

The cam 13 further comprises an ear 63 extending from the clamping portion 66 and provided for the actuation of that cam 13.

It will be noted that the fastening portion 64 and the clamping portion 66 form an assembly here having the general shape of a triangle from which projects the ear 63.

The fastening portion 64 is configured to be received in the space 84 formed between the second limb 45 of the rim 21 of the lateral wall 19 and the planar portion 82 of that lateral wall 19.

The fastening portion 64 is provided with a through-aperture 65, also called second aperture, configured to receive a journal 25 so as to enable the cam 13 to be rotated around that journal 25 relative to the body 11.

The clamping portion 66 comprises a pressing strip 67 configured to clamp the insulated electrical cable 2 in the housing 17 in the close position of the cam 13, a plurality of reinforcing ribs 91 forming a trellis extending generally between the fastening position 64 and the pressing strip 67, as well as an edge 62 also extending from the fastening portion 64 to the pressing strip 67 and from which projects the ear 63.

The pressing strip 67 has a convex longitudinal profile directed away from the fastening portion 64 and a concave transverse profile directed away from the fastening position 64.

The concave profile of the pressing strip 67 forms a recess 76 provided on a surface of that pressing strip 67, which recess 76 enables the cam 13 to conform at least substantially and partially to the contour of the insulated electrical cable 2 to keep it in the housing 17.

The pressing strip 67 is provided with a plurality of transverse holding ribs 68 and engaging spikes 69 formed projecting from the surface of the pressing strip 67, in the recess 76, and provided to come into contact with the insulating sheath 8 of the cable 2.

The form of the cam 13 and in particular of the pressing strip 67 makes it possible to optimize the range of cross-sections of the electrical cables able to be clamped by the anchoring clamp 1 and furthermore to improve the automatic clamping of cables able to be received in the housing 17. In other words, the spikes 69 enable the driving of the cam 13 relative to the body 11 when the cable 2 slides in the housing 17 so as to progressively clamp the cable 2 in the housing 17.

The ear 63 has a pressing and gripping portion 74 extending from one end of the pressing strip 67 and being configured to enable the passage from one to the other of the first and second stable positions of the cam 13 under the action of a user.

The ear 63 furthermore has a tab 71 extending from the edge 62 of the clamping portion 66 and passing along that edge 62 so as to define a receiving space 75 for the connection of the holding member 12.

The pressing and gripping portion 74 and the tab 71 extend substantially facing each other and the ear 63 is furthermore provided with a reinforcing web 72 connecting that pressing and gripping portion 74 and that tab 71.

The pressing and gripping portion 74 comprises a plurality of ridges 70 provided projecting from an outside surface of that pressing and gripping portion 74.

Figures 10, 11, 12:
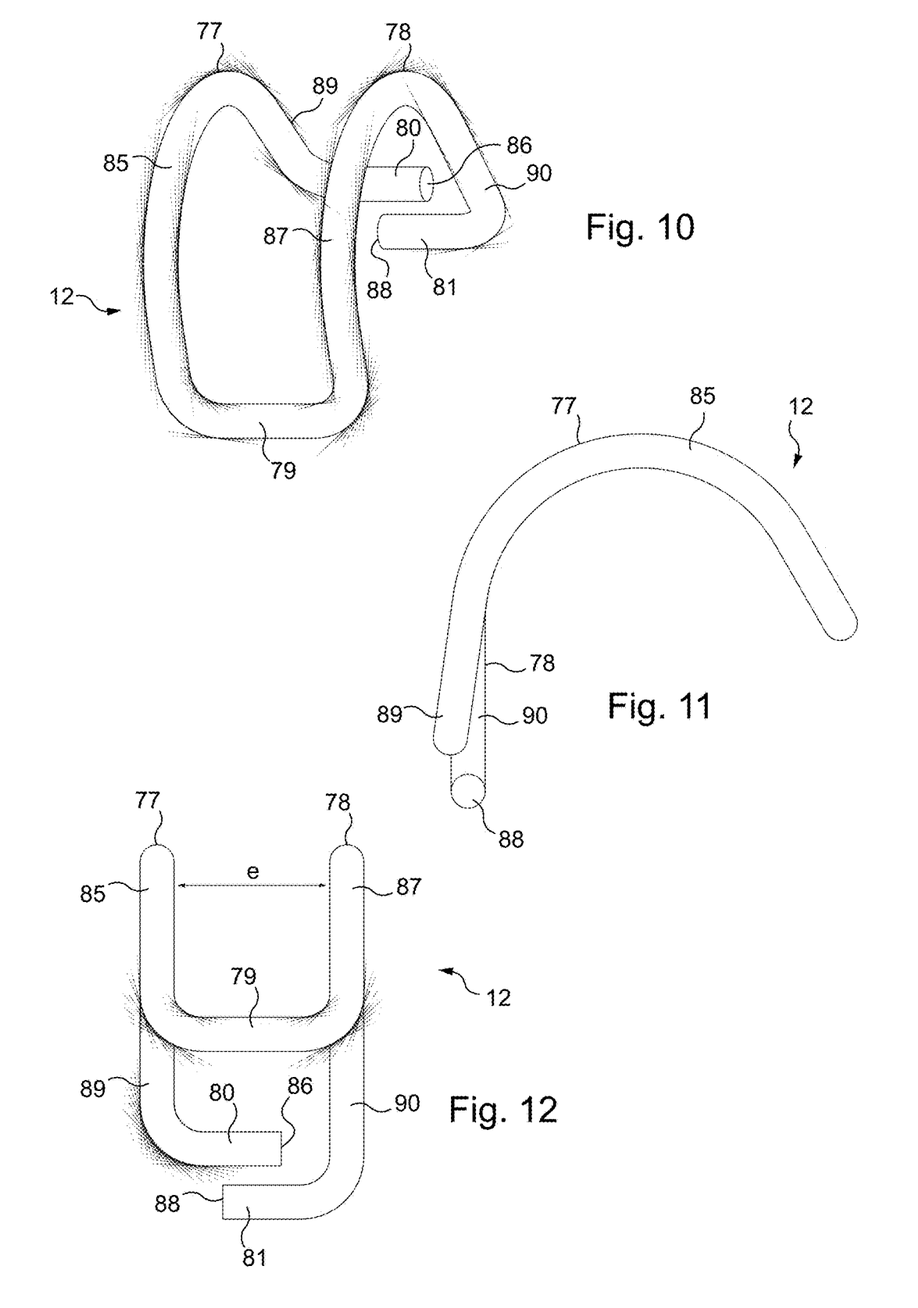
FIG. 10 is a perspective view of a holding spring of the clamp illustrated in FIG. 2.
FIGS. 11 and 12 are respectively views from the side and the front of the spring illustrated in FIG. 11.

The spring 12 will now be described in more detail with reference to FIGS. 10 to 12.

The spring 12, formed here by a shaped metal wire, comprises a first curved limb 77 ending at a first free end 86 of the spring 12, a second curved limb 78 ending at a second free end 88 of the spring 12, and a junction portion 79 joining the first and second limbs 77 and 78.

The first curved limb 77 is provided with a first curved portion 85 extending substantially in a first plane, and a first folded portion 80 extending transversely to the first plane and forming the first free end 86.

The second curved limb 78 is provided with a second curved portion 87 extending substantially in a second plane parallel to the first plane, and a second folded portion 81 extending transversely to the second plane and forming the second free end 88.

The junction portion 79 extends furthermore transversely to the first and second planes and is configured to be received in the receiving space 75 formed between the transverse edge 62 of the clamping portion 66 and the tab 71 of the ear 63.

The first folded portion 80 is directed towards the second limb 78 and the second folded portion 81 is directed towards the first limb 77.

The first and second curved portions 85 and 87 extend for the most part in parallel, except over the first and second respective segments 89 and 90, respectively situated adjacent the first and second folded portions 80 and 81. The first and second curved portions 85 and 87 furthermore have different lengths, the first segment 89 being shorter than the second segment 90.

The first and second curved limbs 77 and 78 are thus configured such that the first folded portion 80 and the second folded portion 81 extend in axially offset directions.

The first and second curved portions 85 and 87 furthermore extend at a distance from each other and are spaced apart by a spacing e which is constant. This spacing e here is at least slightly greater than the thickness of the curb 26 measured between its first and second faces 27 and 28.

The first and second free ends 86 and 88 are here configured to be inserted into the first and second apertures 41 and 42, each of them being free to rotate in these latter.

More specifically, here, the first folded portion 80 is partially inserted into the first aperture 41 on the first face 27 whereas the second folded portion 81 is partially inserted into the second aperture 42 on the second face 28.

The body 11 and the spring 12 are thus configured such that the cam 13 has its first and second stable positions, described above and a tipping position between its first and second stable positions.

A description will now be made with reference to FIGS. 13 to 16 of the method of assembly of the insulated electrical cable 2 with the anchoring clamp 1 and more specifically, successively, the attachment of the clamp 1, the insertion of the cable 2 into the clamp 1 and the clamping of the cable 2 in the clamp 1.

The securing loop 15 is attached at the location of its elbow portion 22 to the second end 35 of the insulator 32.

The arms 20 of the loop 15 are pressed to be flexed in order to momentarily insert the folded portions 14 of the free ends 46 of the arms 20 into the recesses 57 provided in the protuberances 48 of the fastening block 44, then the pressure applied on the arms 20 is relaxed in order for the folded portions 14 to be received in the through-holes 58 of the protuberances 48. The arms 20 are pivoted to be inserted into the grooves 56.

Figure 13:
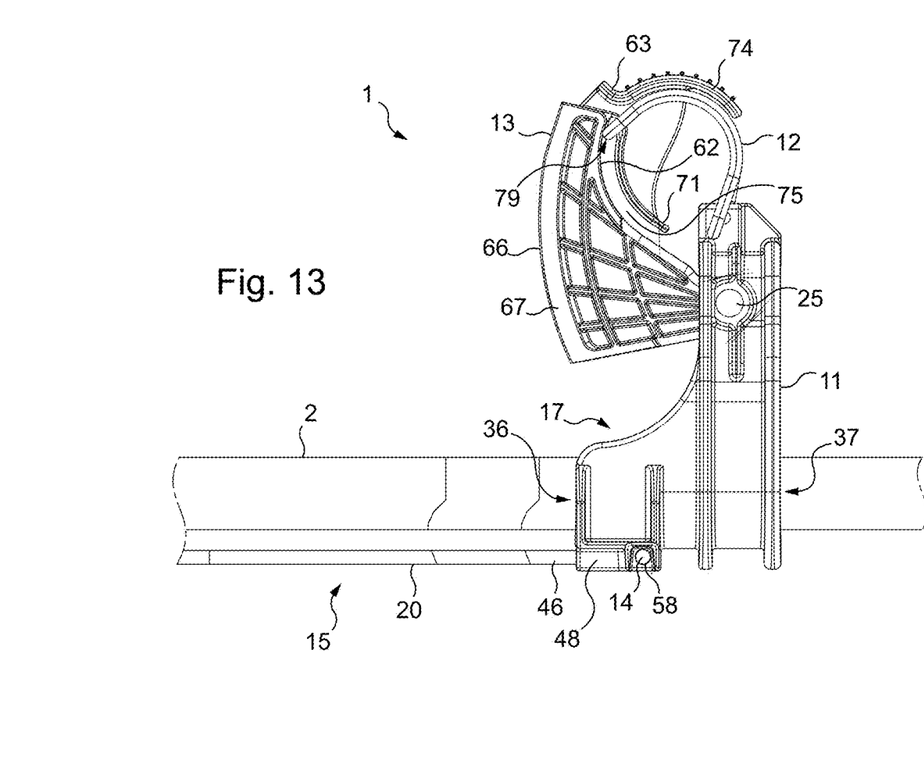
FIGS. 13 and 14 are views respectively from the side and the front of the clamp illustrated in FIG. 2, in its open configuration with the cable inserted therein but not clamped.

The cable 2 is inserted by the longitudinal opening 18 into the housing 17 of the body 11.

The cam 13 is in the away position such that the clamping portion 66 is at a distance from the housing 17 (FIGS. 13 and 14). The cam 13 is stable in away position thanks to the spring 12.

In this away position of the cam 13, the junction portion 79 of the spring 12 is housed in the receiving space 75 of the cam 13, in immediate proximity or even bearing against a portion of the tab 71 of the ear 63 by which that tab 71 emerges from the edge 62 of the clamping portion 66 of the cam 13.

The cable 2 is thus not clamped by the cam 13 and the clamp 1 is in an open configuration.

For the clamping of the cable 2 (FIGS. 15 and 16), the cam 13 is moved from its stable away position by the action of a force applied to the pressing and gripping portion 74, against the spring 12, until a tipping position is reached.

Figure 15:
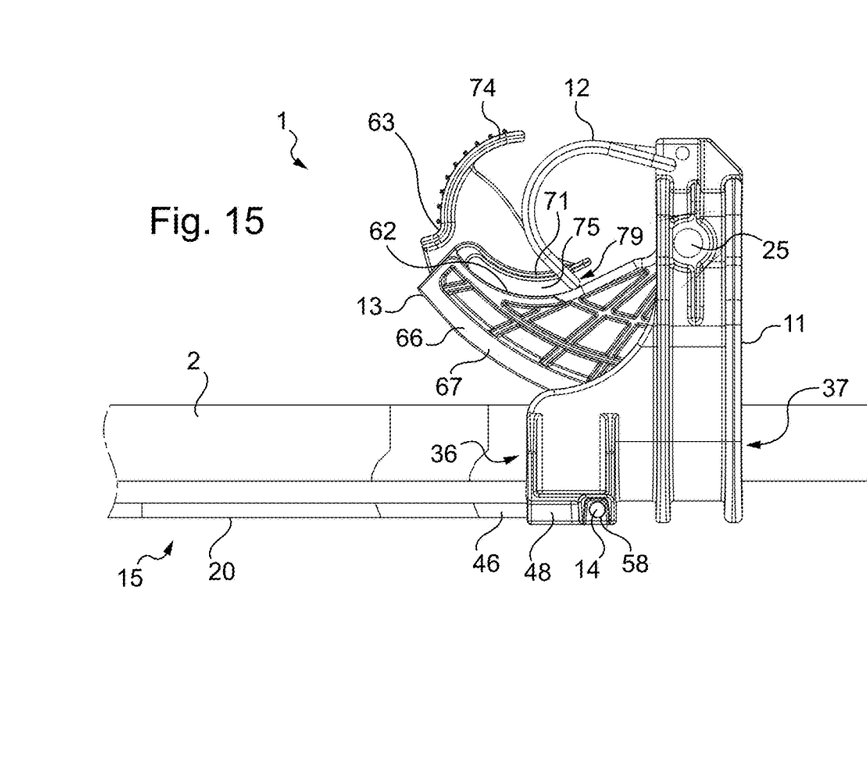
FIGS. 15 and 16 are respectively views in perspective and from the front of the clamp illustrated in FIG. 2, in a closed configuration in which the cable is clamped.

Beyond this tipping position, it is the spring 12 which rotates the cam 13 around the journal 25 and relative to the body 11 until its stable close position is reached.

When the spring 12 moves the cam 13, the junction portion 79 of the spring 12 is movable in the reception space 75, along the edge 62 of the clamping portion 66 against which the junction portion 79 bears, in the opposite direction to the portion of the tab 71 by which the latter emerges from the edge 62.

In the close position of the cam 13, the pressing strip 67 is partially inserted into the housing 17 by its first end 36, and the transverse holding ribs 68 as well as the engaging spikes 69 provided projecting from the surface of the pressing strip 67 are in contact with the sheath of the cable 2.

The cam 13 is held in its stable close position in which it is in immediate proximity to the housing 17 and clamps the cable 2 by virtue of the spring 12 which maintains a pressing force on that cam 13.

The cable 2 is furthermore clamped, without risk of sliding relative to the cam 13, in the housing 17 by virtue of the transverse holding ribs 68 and the engaging spikes 69 which provide a strong coefficient of adhesion between the pressing strip 67 and the insulating sheath 8 of the cable 2.

This is thus a first clamping, here automatic, of the cable 2 in the housing 17.

The fact that the anchoring clamp 1 is attached by the securing loop 15 causes the insulated electrical cable 2, on account of its weight, to be pulled on the same side as the second end 37 of the housing 17 and thus to rotate the cam 13.

The pressing strip 67 follows the cable 2 and therefore enters further into the housing 17 so as to further clamp the cable 2 in the housing 17.

The clamp 1 is therefore in a closed configuration.

To withdraw the cable 2 from the clamp 1, the non-tensioned portion 4 of the cable 2 is pulled such that the cable 2 rotates the cam 13, against the force applied by the spring 12.

This is a first unclamping of the cable 2, which is still held clamped in the housing 17 by the cam 13, under the effect of the spring 12, since the cam 13 is not moved until it reaches its tipping position.

The cam 13 is then moved from its close position until it reaches its tipping position by the action of the user grasping the pressing and gripping portion 74, against the force of the spring 12 and, beyond its tipping position, the cam 13 is driven by the spring 12 until it reaches its away position.

The cable 2 may then be withdrawn from the housing 17 and the clamp 1 is again in open configuration.

In variants that are not illustrated:
the insulated electrical cable is an overhead cable for high-voltage electrical cables rather than medium-voltage;
the curb is provided with more than two offset apertures, for example three or four, and at least one of the apertures is blind;
the anchoring clamp does not comprise any journal and the fastening portion of the cam has projections configured to engage in apertures formed in the lateral wall of the body;
the anchoring clamp does not include any journal, at least one of the planar portion of the lateral wall and the second limb of the rim of the lateral wall has a projection configured to engage in the fastening portion of the cam; and/or
to withdraw the cable from the clamp 1, the non-tensioned portion of the cable is pulled such that the cable rotates the cam, against the force applied by the spring until it reaches its tipping position in which the cam is then driven by the spring until it reaches its away position.

It should be noted more generally that the invention is not limited to the examples described and represented.

The invention claimed is:
1. An anchoring clamp for an insulated electrical cable (2) provided with a conducting core (9) and an insulating sheath (8) covering said conducting core (9), comprising a body (11) defining a housing (17) configured to receive said cable (2), a securing loop (15) fastened to said body (11) and configured to be attached to a support (6) of some kind, and a cam (13) rotatable relative to said body (11) between a first position in which said cam (13) is at a distance from said housing (17) and a second position in which said cam (13) is in immediate proximity to said housing (17) and is configured to clamp said cable (2) in said housing (17), said anchoring clamp (1) being further configured to prevent said cam (13) from passing freely from its second position to its first position; said anchoring clamp (1) further comprising a holding member (12) which is distinct from said body (11), from said cam (13) and from said securing loop (15), which is connected both to said body (11) and to said cam (13) and which is configured to prevent said cam (13) from passing freely from its second position to its first position;

wherein said holding member (12) has a first free end (86) and a second free end (88) which is an opposite free end to said first free end (86), and said body (11) comprises at least two apertures (41, 42) axially offset from each other, formed at a distance from said housing (17) and each configured to respectively receive said first (86) and second (88) free ends.

2. An anchoring clamp according to claim 1, wherein said holding member (12) is further configured to prevent said cam (13) from passing freely from its first position to its second position.

3. An anchoring clamp according to claim 1, wherein said holding member (12) comprises a first curved limb (77), a second curved limb (78) and a junction portion (79) joining said first and second limbs (77, 78), said first limb (77) is provided with a first folded portion (80) forming said first free end (86) and said second limb (78) is provided with a second folded portion (81) forming said second free end (88).

4. An anchoring clamp according to claim 3, wherein said first folded portion (80) is directed towards said second limb (78) and said second folded portion (81) is directed towards said first limb (77).

5. An anchoring clamp according to claim 3, wherein said body (11) comprises a base (16) in which is formed said housing (17), a lateral wall (19) extending from said base (16) and a curb (26) projecting from said lateral wall (19), at a distance from said housing (17) and in which are formed said at least two apertures (41, 42).

6. An anchoring clamp according to claim 1, wherein said body (11) comprises a base (16) in which is formed said housing (17), a lateral wall (19) extending from said base (16) and a curb (26) projecting from said lateral wall (19), at a distance from said housing (17) and in which are formed said at least two apertures (41, 42).

7. An anchoring clamp according to claim 6, wherein said curb (26) has a first face (27) in which is formed one of the at least two said apertures (41, 42) and a second face (28), which is an opposite face to said first face (27), in which is formed the other of the at least two said apertures (41, 42).

8. An anchoring clamp according to claim 7, wherein said lateral wall (19) has a planar portion (82) extending from said base (16) and a rim (21) extending from said planar portion (82) at a distance from and facing said housing (17), and said curb (26) projects from said rim (21), remotely from said housing (17).

9. An anchoring clamp according to claim 6, wherein said lateral wall (19) has a planar portion (82) extending from said base (16) and a rim (21) extending from said planar portion (82) at a distance from and facing said housing (17), and said curb (26) projects from said rim (21), remotely from said housing (17).

10. An anchoring clamp according to claim 9, wherein said rim (21) is L-shaped and is provided with a first limb (40) extending from said planar portion (82) and a second limb (45) continuing said first limb (40) and extending on the same side as said housing (17).

11. An anchoring clamp according to claim 1, wherein said body (11) has an inside face (30) at least partially defining said housing (17), an outside face (31) which is an opposite face to said inside face (30), and at least one rib (59) formed projecting from said outside face (31).

12. An anchoring clamp according to claim 1, wherein said securing loop (15) comprises two arms (20) connected to each other by an elbow portion (22), and said body (11) has an inside face (30) at least partially defining said housing (17), an outside face (31) which is an opposite face to said inside face (30), and a block (44) for fastening said securing loop (15) and which is formed projecting from said outside face (31), which fastening block (44) is provided with at least two guide grooves (56) configured to receive at least partially the two said arms (20) of said securing loop (15).

13. An anchoring clamp according to claim 1, wherein said body (11) comprises a base (16) in which is formed said housing (17) and a lateral wall (19) extending from said base (16), and said cam (13) has a fastening portion (64) rotatably mounted on said lateral wall (19) and at a distance from said housing (17), and a clamping portion (66) remote from said fastening portion (64) and configured to be at a distance from said housing (17) when the cam (13) is in its first position and to be in immediate proximity to said housing (17) when the cam (13) is in its second position.

14. An anchoring clamp according to claim 13, wherein said clamp further comprises a journal (25) configured to be inserted at least partially both in at least a first aperture (23, 24) formed in said lateral wall (19) of said body (11), at a distance from said housing (17), and in a second aperture (65) formed in said fastening portion (64) of said cam (13); and said cam (13) is rotatable around said journal (25) relative to said body (11).

15. An anchoring clamp according to claim 14, wherein said clamping portion (66) has a convex longitudinal profile directed away from said fastening portion (64) and a concave transverse profile directed away from said fastening portion (64).

16. An anchoring clamp according to claim 13, wherein said clamping portion (66) has a convex longitudinal profile directed away from said fastening portion (64) and a concave transverse profile directed away from said fastening portion (64).

17. An anchoring clamp according to claim 16, wherein said concave transverse profile of said clamping portion (66) forms a recess (76) provided on a surface of said clamping portion (66), which recess (76) is configured such that said cam (13), in its second position, conforms at least substantially and partially to a contour of said insulated electrical cable (2) to keep it in said housing (17).

18. An anchoring clamp according to claim 17, wherein said clamping portion (66) is provided with a plurality of transverse holding ribs (68) and engaging spikes (69) formed projecting from said surface, in said recess (76), and which are provided to come into contact with said insulating sheath (8) of the insulated electrical cable (2).

19. An anchoring clamp according to claim 13, wherein said cam (13) comprises an ear (63) extending from said clamping portion (66) and having a pressing and gripping portion (74) configured to allow the passage from one to the other of the first and second positions of said cam (13) under the action of a user; and/or said ear (63) has a tab (71) passing along an edge (62) of said clamping portion (66) so as to define a receiving space (75) configured to receive a junction portion (79) of said holding member (12).

* * * * *